US010876500B2

(12) United States Patent
Kitagawa et al.

(10) Patent No.: US 10,876,500 B2
(45) Date of Patent: Dec. 29, 2020

(54) CONTROL DEVICE OF INTERNAL COMBUSTION ENGINE

(71) Applicant: TOYOTA JIDOSHA KABUSHIKI KAISHA, Toyota-shi (JP)

(72) Inventors: Eiki Kitagawa, Susono (JP); Masato Ehara, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/173,062

(22) Filed: Oct. 29, 2018

(65) Prior Publication Data

US 2019/0195173 A1 Jun. 27, 2019

(30) Foreign Application Priority Data

Dec. 27, 2017 (JP) ................................ 2017-251775

(51) Int. Cl.

| | |
|---|---|
| ***B60T 7/12*** | (2006.01) |
| ***F02M 26/09*** | (2016.01) |
| ***F02D 41/14*** | (2006.01) |
| *F02B 3/06* | (2006.01) |
| *F02M 26/08* | (2016.01) |
| *F02D 41/00* | (2006.01) |

(52) U.S. Cl.

CPC ......... *F02M 26/09* (2016.02); *F02D 41/1405* (2013.01); *F02B 3/06* (2013.01); *F02D 41/0007* (2013.01); *F02D 41/0072* (2013.01); *F02D 2041/1437* (2013.01); *F02D 2200/0402* (2013.01); *F02M 26/08* (2016.02)

(58) Field of Classification Search

CPC .... F02D 41/1404; F02D 41/1405; G06N 3/02
USPC ................................ 701/101, 106, 114, 115
See application file for complete search history.

(56) References Cited

U.S. PATENT DOCUMENTS

| | | | | |
|---|---|---|---|---|
| 2010/0050025 | A1* | 2/2010 | Grichnik ................ | G05B 17/02 714/47.2 |
| 2018/0300964 | A1* | 10/2018 | Lakshamanan ...... | G05D 1/0088 |
| 2019/0242318 | A1* | 8/2019 | Kitagawa ............... | G06N 3/084 |
| 2019/0311262 | A1* | 10/2019 | Nagasaka ................ | F01N 9/00 |

(Continued)

FOREIGN PATENT DOCUMENTS

| | | |
|---|---|---|
| JP | H11-085719 A | 3/1999 |
| JP | 2007-285212 A | 11/2007 |
| JP | 2012-112277 | 6/2012 |

(Continued)

*Primary Examiner* — John Kwon

(74) *Attorney, Agent, or Firm* — Oblon, McClelland, Maier & Neustadt, L.L.P.

(57) ABSTRACT

A control device of an internal combustion engine using a neural network, wherein an output value obtained by experiments is made training data for a value of an operating parameter of the engine in a presumed usable range, while an output value obtained by prediction without relying on experiments is made training data for a value of the operating parameter of the engine outside of the presumed usable range. The training data obtained by experiments and the training data obtained by prediction are used to learn the weights and the biases of the neural network so that an output value which changes in accordance with a value of an operating parameter of the engine matches the training data, and thereby even outside of the presumed usable range of the operating parameter, the output value can be suitably estimated.

4 Claims, 10 Drawing Sheets

(56) References Cited

U.S. PATENT DOCUMENTS

2019/0325671 A1* 10/2019 Takasu .................... G06N 3/04

FOREIGN PATENT DOCUMENTS

| | | | |
|---|---|---|---|
| JP | 2012-149839 | A | 8/2012 |
| JP | 2012-172617 | A | 9/2012 |
| JP | 2012-237296 | A | 12/2012 |

* cited by examiner

CONTROL DEVICE OF INTERNAL COMBUSTION ENGINE

TECHNICAL FIELD

The present invention relates to a control device of an internal combustion engine.

BACKGROUND ART

In control devices of internal combustion engines using neural networks, there is known a control device of an internal combustion engine designed to learn in advance the weights and biases of a neural network based on values of an engine speed, amount of intake air, and other operating parameters of the engine so that an amount of gas sucked into a combustion chamber matches an actual amount of gas sucked into the combustion chamber and to use the neural network with the learned weights at the time of engine operation so as to estimate the amount of gas sucked into the combustion chamber from the values of the operating parameters of the engine (for example, see Japanese Patent Publication No. 2012-112277A).

SUMMARY OF INVENTION

Technical Problem

In this regard, the usable ranges of the values of the operating parameters of an engine, such as the engine speed, can be presumed in advance according to the type of the engine, therefore the weights and biases of the neural network are learned in advance so that usually, in the usable ranges of the values of the operating parameters of the engine presumed in advance, an output value of the neural network matches an actual value, such as the actual amount of gas sucked into a combustion chamber.

However, in actuality, the values of operating parameters of an engine sometimes deviate from the presumed usable ranges. In such a case, since learning based on actual values is not conducted for values outside the presumed usable ranges, there is the problem that an output value calculated using the neural network will be a value greatly deviating from the actual value.

To solve this problem, according to the present invention, there is provided a control device of an internal combustion engine having an electronic control unit, the electronic control unit comprising;

- a parameter value acquiring unit for acquiring a value of an operating parameter of the engine,
- a processing unit for performing processing using a neural network comprised of an input layer, at least one hidden layer, and an output layer, and
- a storage unit, the value of the operating parameter of the engine being input to the input layer, and an output value which changes in accordance with the value of the operating parameter of the engine being output from the output layer, wherein
- there is a presumed usable range for the value of the operating parameter of the engine,
- an output value obtained by experiments is stored as training data in the storage unit for a value of the operating parameter of the engine within the presumed usable range, an output value obtained by prediction without relying on experiments is stored as training data in the storage unit for a value of the operating parameter of the engine outside the presumed usable range,
- the training data obtained by experiments and the training data obtained by prediction are used in the processing unit to learn at least one weight and at least one bias of the neural network so that an output value which changes in accordance with the value of the operating parameter of the engine matches the training data corresponding to the value of the operating parameter of the engine, and
- the neural network for which the weight and the bias are learned is used to estimate the output value for the value of the operating parameter of the engine.

Advantageous Effects of Invention

By learning weight and bias of the neural network by using the output value obtained by prediction without relying on experiments for values of operating parameter of the engine outside the presumed usable ranges as the training data, it is possible to keep the output value estimated using the neural network from becoming a value greatly deviating from the actual value when a value of an operating parameter of the engine becomes a value outside the presumed range.

BRIEF DESCRIPTION OF DRAWINGS

FIG. 3A and FIG. 3B are views showing changes in values of a Sigmoid function a.

DESCRIPTION OF EMBODIMENTS

Overall Configuration of Internal Combustion Engine

Figure 1:
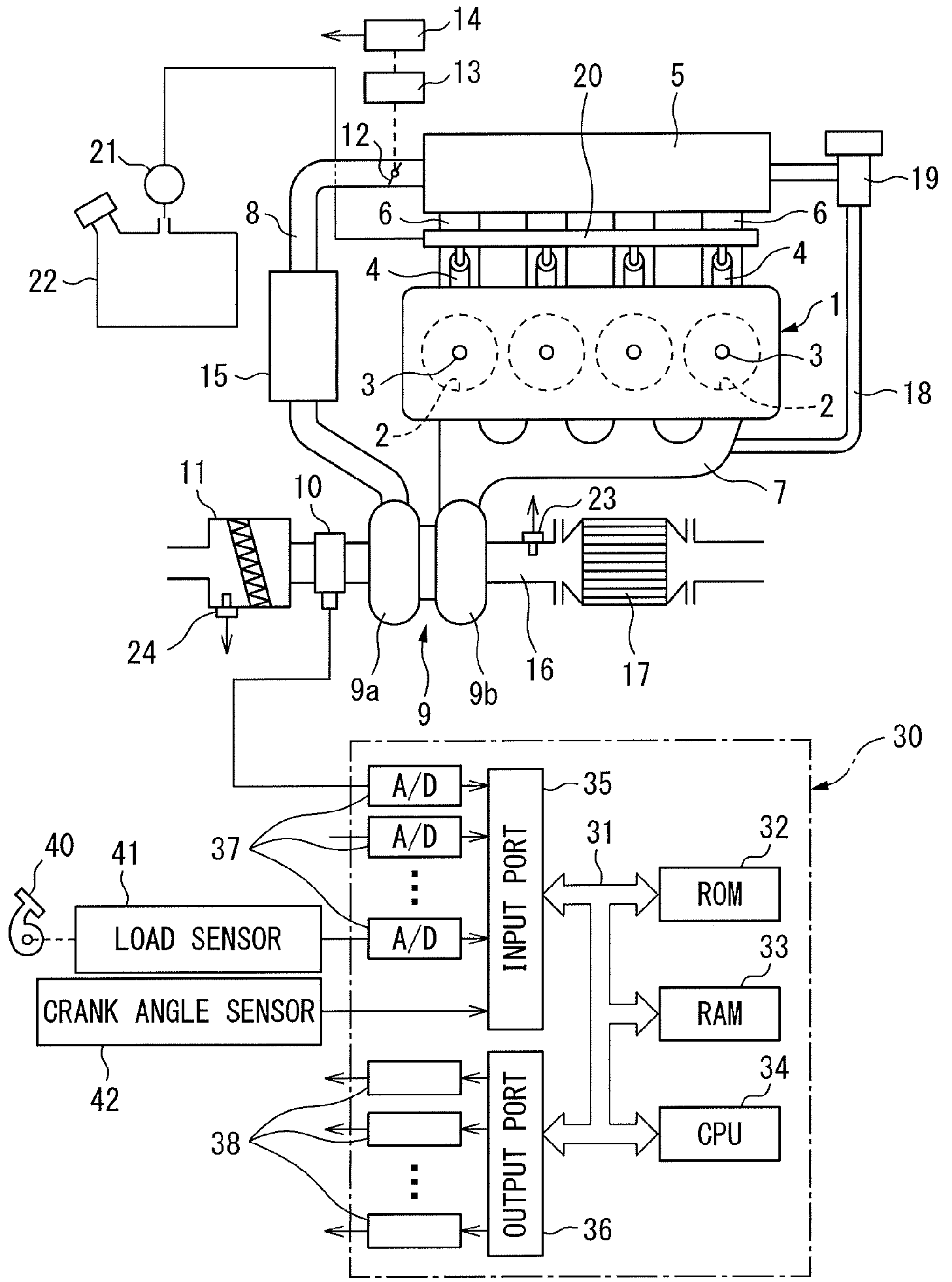
FIG. 1 is an overall view of an internal combustion engine.

FIG. 1 shows the overall configuration of an internal combustion engine. Referring to FIG. 1, 1 shows an engine body, 2 combustion chambers of the cylinders, 3 spark plugs arranged in the combustion chambers 2 of the cylinders, 4 fuel injectors for injecting fuel, for example, gasoline, to the cylinders, 5 a surge tank, 6 intake branch pipes, and 7 an exhaust manifold. The surge tank 5 is connected through an intake duct 8 to the outlet of a compressor 9*a* of an exhaust turbocharger 9, while the inlet of the compressor 9*a* is connected through an intake air amount detector 10 to an air cleaner 11. Inside the intake duct 8, a throttle valve 12 driven by an actuator 13 is arranged. At the throttle valve 12, a throttle valve opening degree sensor 14 for detecting the throttle valve opening degree is attached. Further, around the intake duct 8, an intercooler 15 is arranged for cooling the intake air flowing through the inside of the intake duct 8.

On the other hand, the exhaust manifold 7 is connected to the inlet of the exhaust turbine 9*b* of the exhaust turbocharger 9, while the outlet of the exhaust turbine 9*b* is connected through an exhaust pipe 16 to an exhaust purification use catalytic converter 17. The exhaust manifold 7 and the surge tank 5 are connected with each other through an exhaust gas recirculation (below, referred to as "EGR") passage 18. Inside the EGR passage 18, an EGR control valve 19 is arranged. Each fuel injector 4 is connected to a fuel distribution pipe 20. This fuel distribution pipe 20 is connected through a fuel pump 21 to a fuel tank 22. Inside the exhaust pipe 16, an $NO_X$ sensor 23 is arranged for detecting the concentration of $NO_X$ in the exhaust gas. Further, inside the air cleaner 11, an atmospheric temperature sensor 24 is arranged for detecting the atmospheric temperature.

An electronic control unit 30 is comprised of a digital computer provided with a ROM (read only memory) 32, RAM (random access memory) 33, CPU (microprocessor) 34, input port 35, and output port 36, which are connected with each other by a bidirectional bus 31. At the input port 35, output signals of the intake air amount detector 10, throttle valve opening degree sensor 14, $NO_X$ sensor 23, and atmospheric temperature sensor 24 are input through corresponding AD converters 37. At an accelerator pedal 40, a load sensor 41 generating an output voltage proportional to the amount of depression of the accelerator pedal 40 is connected. The output voltage of the load sensor 41 is input through the corresponding AD converter 37 to the input port 35. Furthermore, the input port 35 is connected to a crank angle sensor 42 generating an output pulse each time a crankshaft rotates by for example 30°. Inside the CPU 34, the engine speed is calculated based on the output signals of the crank angle sensor 42. On the other hand, the output port 36 is connected through corresponding drive circuits 38 to the spark plugs 3, the fuel injectors 4, the throttle valve drive use actuator 13, EGR control valve 19, and fuel pump 21.

Summary of Neural Network

Figure 2:
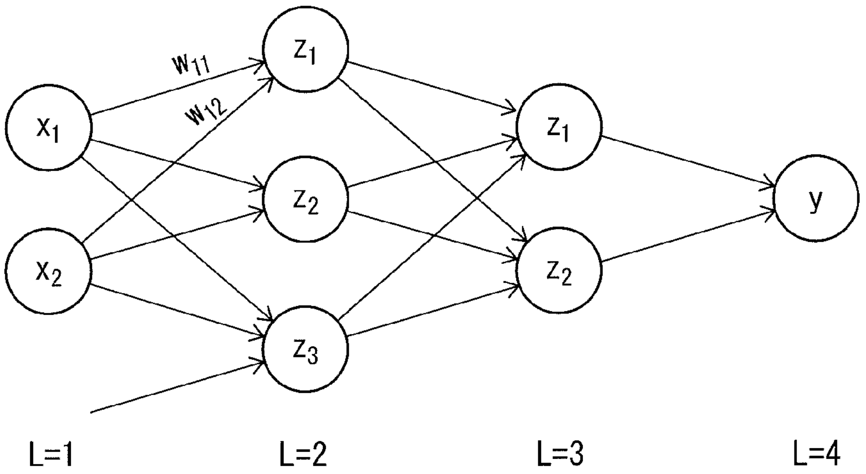
FIG. 2 is a view showing one example of a neural network.

In embodiments of the present invention, neural networks are used to estimate various values representing the performance of the internal combustion engine. FIG. 2 shows one example of a neural network. The circle marks in FIG. 2 show artificial neurons. In the neural network, these artificial neurons are usually called "node" or "unit" (in the present application, they are called "node"). In FIG. 2, L=1 shows an input layer, L=2 and L=3 show hidden layers, and L=4 shows an output layer. Further, in FIG. 2, $x_1$ and $x_2$ show output values from the nodes of the input layer (L=1), "y" shows the output value from the node of the output layer (L=4), $z_1$, $z_2$, and $z_3$ show output values from the nodes of one hidden layer (L=2), $z_1$ and $z_2$ show output values from the nodes of another hidden layer (L=3). Note that, the number of hidden layers may be made one or any other number, while the number of nodes of the input layer and number of nodes of the hidden layers may also be made any numbers. Note that, in the embodiments according to the present invention, the number of nodes of the output layer is made one node.

At the nodes of the input layer, the inputs are output as they are. On the other hand, at the nodes of one hidden layer (L=2), the output values $x_1$ and $x_2$ of the nodes of the input layer are input, while at the nodes of one hidden layer (L=2), the respectively corresponding weights "w" and biases "b" are used to calculate the sum input value "u". For example, a sum input value $u_k$ calculated at a node shown by $z_k$ (k=1, 2, 3) of one hidden layer (L=2) in FIG. 2 becomes as shown in the following formula:

$$U_k = \sum_{m=1}^{n} (x_m \cdot w_{km}) + b_k$$

Next, this sum input value $u_k$ is converted by an activating function "f" and is output from a node shown by $z_k$ of one hidden layer (L=2) as an output value $z_k$ (=f($u_k$)). The same is true for the other nodes of one hidden layer (L=2). On the other hand, the nodes of another hidden layer (L=3) receive as input the output values $z_1$, $z_2$, and $z_3$ of the nodes of one hidden layer (L=2). At the nodes of the other hidden layer (L=3), the respectively corresponding weights "w" and biases "b" are used to calculate the sum input value u(Σz·w+b). The sum input value "u" is similarly converted by an activating function and output from the nodes of the other hidden layer (L=3) as the output values $z_1$ and $z_2$. Note that, in embodiments according to the present invention, as this activating function, a Sigmoid function a is used.

On the other hand, at the node of the output layer (L=4), the output values $z_1$ and $z_2$ of the nodes of the other hidden layer (L=3) are input. At the node of the output layer, the respectively corresponding weights "w" and biases "b" are used to calculate the sum input value u(Σz·w+b) or just the respectively corresponding weights "w" are used to calculate the sum input value u(Σz·w). In this embodiment according to the present invention, at the node of the output layer, an identity function is used, therefore, from the node of the output layer, the sum input value "u" calculated at the node of the output layer is output as it is as the output value "y".

Expression of Function by Neural Network

Figure 3A:
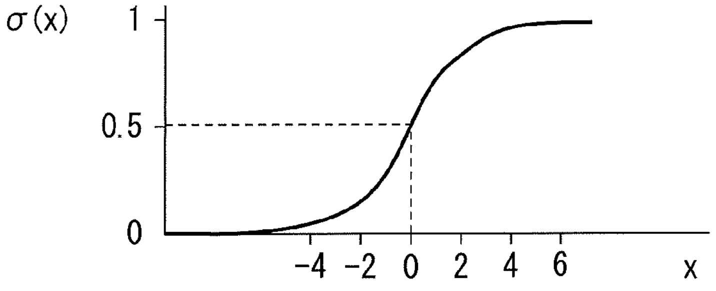
Figure 3B:
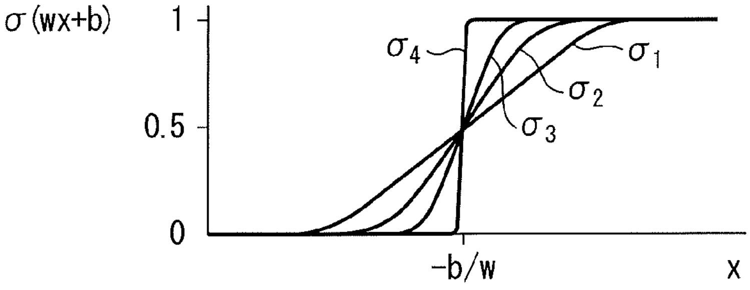

Now then, it is possible to express any function if using a neural network. Next, this will be simply explained. First, if explaining the Sigmoid function a used as the activating function, the Sigmoid function σ is expressed as σ(x)=1/(1+exp(−x)) and takes a value between 0 and 1 corresponding to the value of "x" as shown in FIG. 3A. Here, if replacing "x" with "wx+b", the Sigmoid function σ is expressed as σ(wx+b)=1/(1+exp(−wx−b)). Here, if increasing the value of "w", as shown by the curves $\sigma_1$, $\sigma_2$, and $\sigma_3$ in FIG. 3B, the slant of the curved part of the Sigmoid function σ(wx+b) gradually becomes steeper. If making the value of "w" infinitely large, as shown by the curve $\sigma_4$ in FIG. 3B, the Sigmoid function σ(wx+b) changes in steps as shown in FIG. 3B at the "x" where x=−b/w(wx+b=0), that is, at the "x" where $\sigma(wx+b)=0.5$. If utilizing this property of the Sigmoid function a, a neural network can be used to express any function.

Figure 4A:
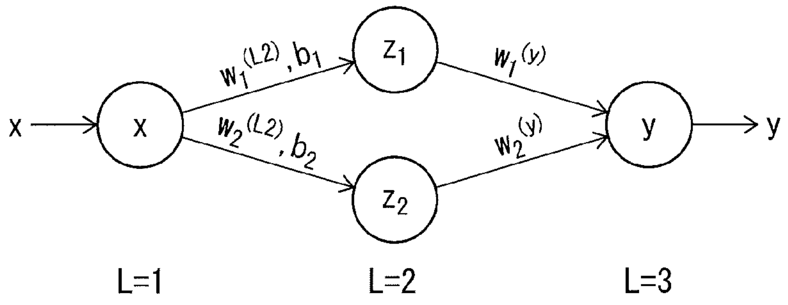
FIG. 4A and FIG. 4B respectively are views showing a neural network and output values from nodes of a hidden layer.

For example, using a neural network such as shown in FIG. 4A comprising an input layer (L=1) comprised of a single node, a hidden layer (L=2) comprised of two nodes, and an output layer (L=3) comprised of a single node, it is possible to express a function approximating a quadratic function. Note that, in this neural network, as shown in FIG. 4A, the node of the input layer (L=1) receives as input the input value "x", while the node shown by $z_1$ at the hidden layer (L=2) receives as input the input value $u=x\cdot w_1^{(L2)}+b_1$ calculated using a weight $w_1^{(L2)}$ and a bias $b_1$. This input value "u" is converted by the Sigmoid function $\sigma(x\cdot w_1^{(L2)}+b_1)$ and output as the output value $z_1$. Similarly, the node shown by $z_2$ at the hidden layer (L=2) receives as input the input value $u=x\cdot w_2^{(L2)}+b_2$ calculated using the weight $w_2^{(L2)}$ and bias $b_2$. This input value "u" is converted by the Sigmoid function $\sigma(x\cdot w_2^{(L2)}+b_2)$ and output as the output value $z_2$.

On the other hand, the node of the output layer (L=3) receives as input the output values $z_1$ and $z_2$ of the nodes of the hidden layer (L=2). At the node of the output layer, the respectively corresponding weights $w_1^{(y)}$ and $w_2^{(y)}$ are used to calculate the sum input value u $(\Sigma z\cdot w=z_1\cdot w_1^{(y)}+z_2\cdot w_2^{(y)})$. As explained above, in the embodiments according to the present invention, at the node of the output layer, an identity function is used. Therefore, from the node of the output layer, the sum input value "u" calculated at the node of the output layer is output as is as the output value "y".

Figure 4B:
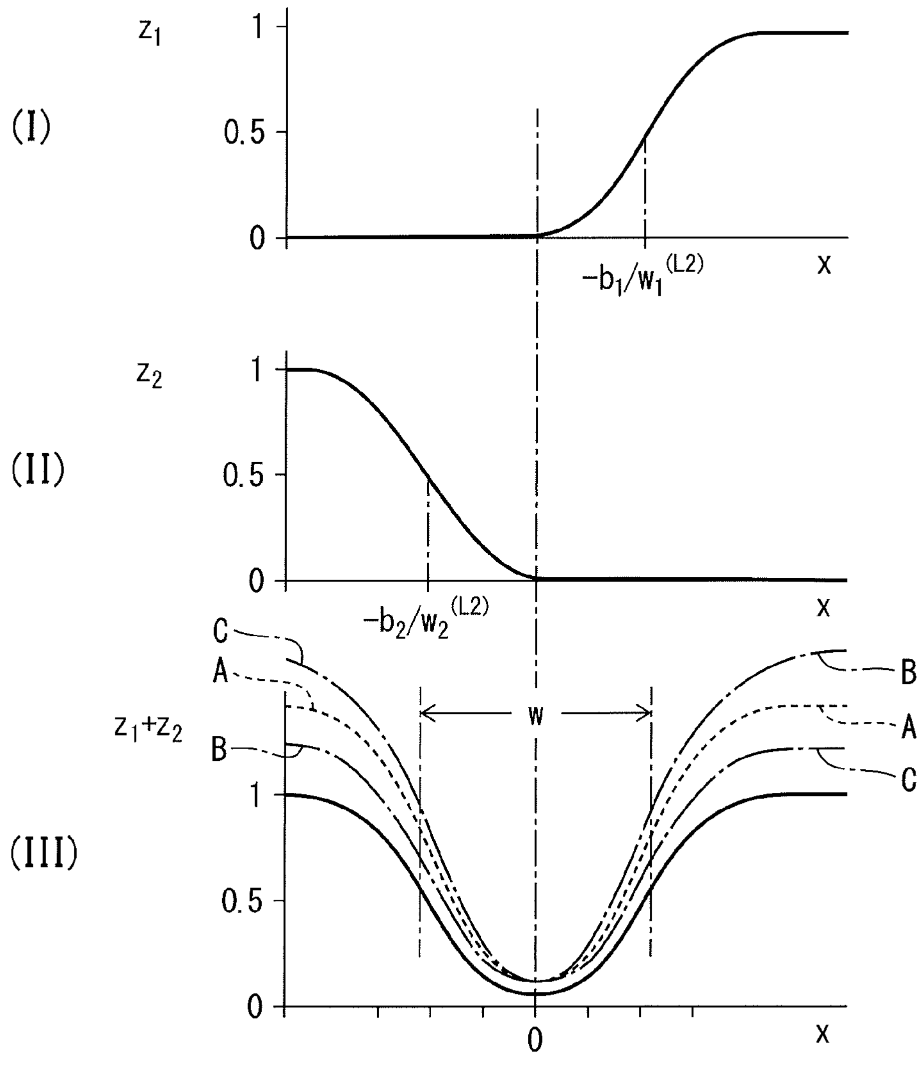

FIG. 4B(I) shows the output value $z_1$ from a node of one hidden layer (L=2) when the weight $w_1^{(L2)}$ and bias $b_1$ are set so that the value of the Sigmoid function $\sigma(x\cdot w_1^{(L2)}+b_1)$ at x=0 becomes substantially zero. On the other hand, at the Sigmoid function $\sigma(x\cdot w_2^{(L2)}+b_2)$, for example, if making the weight $w_2^{(L2)}$ a minus value, the shape of the curve of the Sigmoid function $\sigma(x\cdot w_2^{(L2)}+b_2)$ becomes a shape decreasing along with an increase of "x" such as shown by FIG. 4B(II). At FIG. 4B(II), the change of the output value $z_2$ from the node of the hidden layer (L=2) when the weight $w_2^{(L2)}$ and bias $b_2$ are set so that the value of the Sigmoid function $\sigma(x\cdot w_2^{(L2)}+b_2)$ at x=0 becomes substantially zero is shown.

On the other hand, in FIG. 4B(III), the sum $(z_1+z_2)$ of the output values $z_1$ and $z_2$ from the nodes of the hidden layer (L=2) is shown by the solid line. Note that, as shown in FIG. 4A, the output values $z_1$ and $z_2$ are multiplied with the respectively corresponding weights $w_1^{(y)}$ and $w_2^{(y)}$. In FIG. 4B (III), the change in the output value "y" when $w_1^{(y)}$ and $w_2^{(y)}>1$ and $w_1^{(y)}\approx w_2^{(y)}$ is shown by the broken line A. Furthermore, in FIG. 4B(III), the change in the output value "y" when $w_1^{(y)}$ and $w_2^{(y)}>1$ and $w_1^{(y)}>w_2^{(y)}$ is shown by the one-dot broken line B, while in FIG. 4B(III), the change in the output value "y" when $w_1^{(y)}$ and $w_2^{(y)}>1$ and $w_1^{(y)}<w_2^{(y)}$ is shown by the one-dot broken line C. In FIG. 4B(III), the shape of the broken line A in the range shown by W shows a curve approximating a quadratic function such as shown by $y=ax^2$ ("a" is a coefficient), therefore, it will be understood that by using a neural network such as shown in FIG. 4A, a function approximating a quadratic function can be expressed.

Figure 5A:
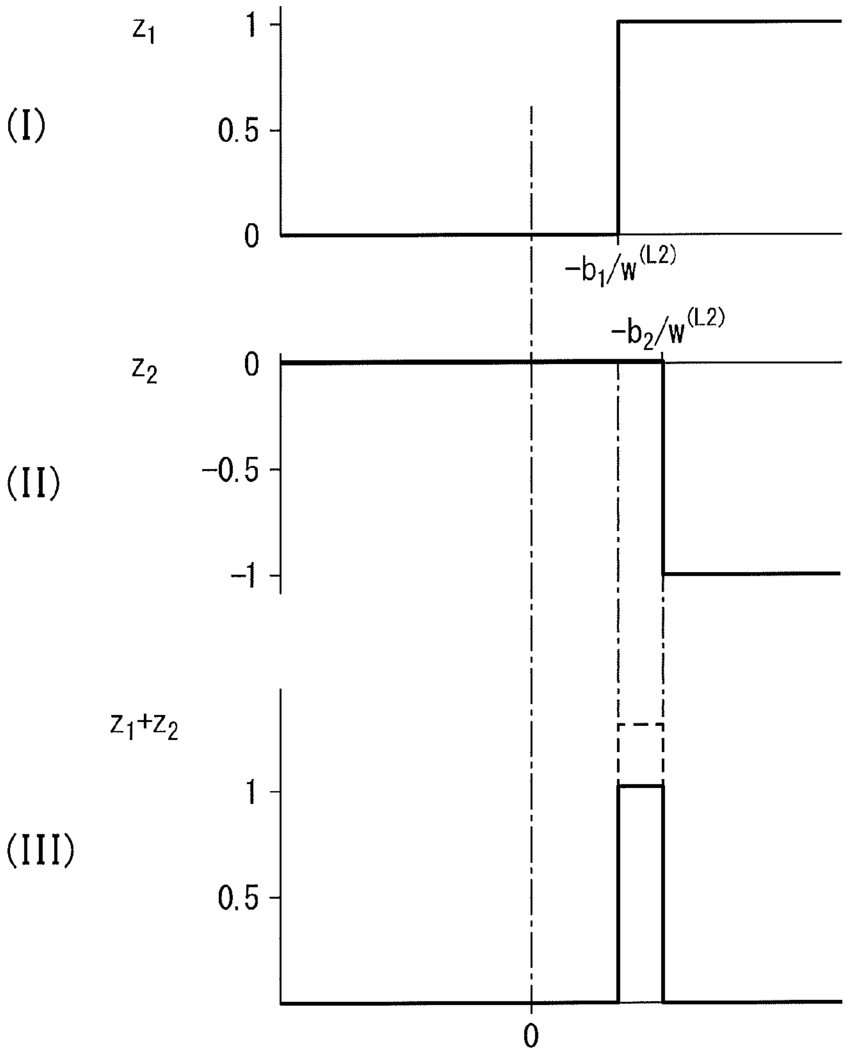
FIG. 5A and FIG. 5B respectively are views showing output values from nodes of a hidden layer and output values from nodes of an output layer.

On the other hand, FIG. 5A shows the case where the values of the weights $w_1^{(L2)}$ and $w_2^{(L2)}$ in FIG. 4A are made larger so as to make the value of the Sigmoid function σ change in steps such as shown in FIG. 3B. In FIG. 5A(I), the output value $z_1$ from a node of the hidden layer (L=2) when the weight $w_1^{(L2)}$ and bias $b_1$ are set so that the value of the Sigmoid function $\sigma(x\cdot w_1^{(L2)}+b_1)$ increases in steps at $x=-b_1/w_1^{(L2)}$ is shown. Further, in FIG. 5A(II), the output value $z_2$ from a node of the hidden layer (L=2) when the weight $w_2^{(L2)}$ and bias $b_2$ are set so that the value of the Sigmoid function $\sigma(x\cdot w_2^{(L2)}+b_2)$ decreases in steps at $x=-b_2/w_2^{(L2)}$ slightly larger than $x=--b_1/w_1^{(L2)}$ is shown. Further, in FIG. 5A(III), the sum $(z_1+z_2)$ of the output values $z_1$ and $z_2$ from the nodes of the hidden layer (L=2) is shown by the solid line. As shown in FIG. 4A, the output values $z_1$ and $z_2$ are multiplied with the respectively corresponding weights $w_1^{(y)}$ and $w_2^{(y)}$. In FIG. 5A(III), the output value "y" when $w_1^{(y)}$ and $w_2^{(y)}>1$ is shown by the broken lines.

Figure 5B:
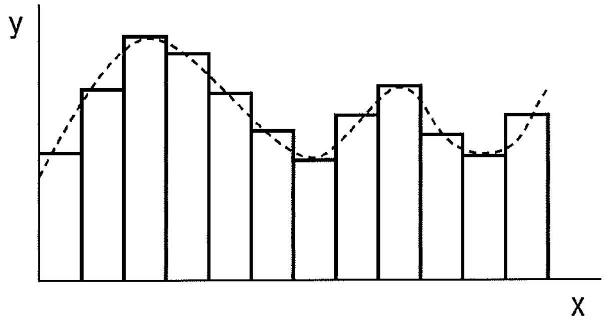
Figure 6A:
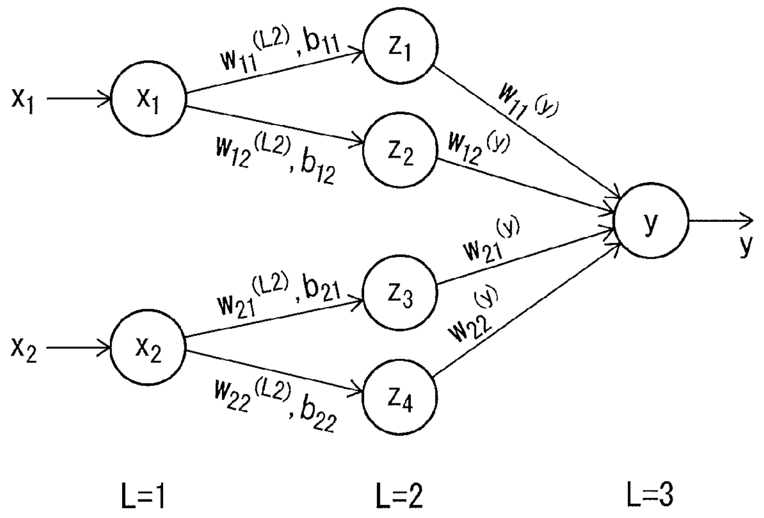
FIG. 6A and FIG. 6B respectively are views showing a neural network and output values from nodes of an output layer.
Figure 6B:
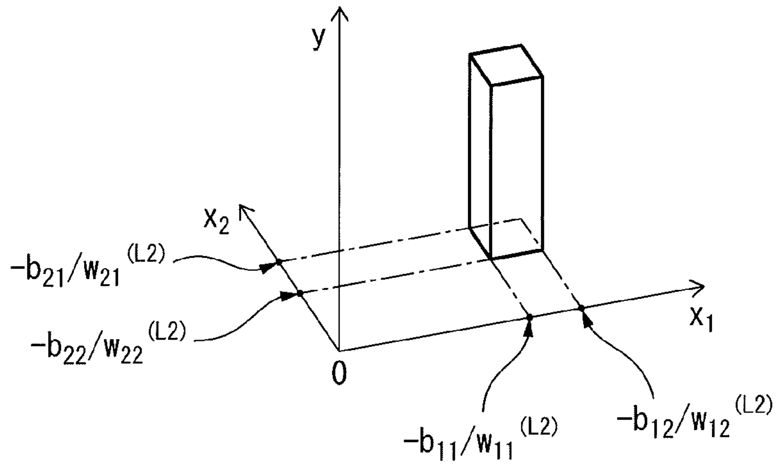

In this way, in the neural network shown in FIG. 4A, from the pair of nodes of the hidden layer (L=2), a bar-shaped output value "y" such as shown in FIG. 5A(III) is obtained. Therefore, if increasing the number of paired nodes in the hidden layer (L=2) and suitably setting the values of the weights "w" and biases "b" at the nodes of the hidden layer (L=2), it becomes possible to express a function approximating the function y=f(x) such as shown by the curved line of the broken line in FIG. 5B. Note that, in FIG. 5B, the bars are drawn contiguous with each other, but in actuality the bars sometimes partially overlap. Further, in actuality, the value of "w" is not infinitely large, so the bars do not become precise bar shapes but become curved shapes like the top half of the curved part shown by $\sigma_3$ in FIG. 3B. Note that, while a detailed explanation will be omitted, as shown in FIG. 6A, if providing pairs of nodes at the hidden layer (L=2) respectively corresponding to the two different input values $x_1$ and $x_2$, as shown in FIG. 6B, column-shaped output values "y" corresponding to the input values $x_1$ and $x_2$ are obtained. In this case, if providing a large number of paired nodes at the hidden layer (L=2) for the input values $x_1$, $x_2$, a plurality of column-shaped output values "y" respectively corresponding to the different input values $x_1$ and $x_2$ are obtained. Therefore, it will be understood that it is possible to express a function showing the relationship between the input values $x_1$ and $x_2$ and the output values "y". Note that, in the case of three or more different input values "x" as well, similarly, it is possible to express a function showing the relationship between the input values "x" and the output values "y".

Learning in Neural Network

On the other hand, in the embodiments according to the present invention, an error backpropagation algorithm is used to learn the values of the weights "w" and biases "b" in a neural network. This error backpropagation algorithm is known. Therefore, the error backpropagation algorithm will be explained simply below in its outlines. Note that, a bias "b" is one kind of weight "w", so in the following explanation, a bias "b" is deemed one type of weight "w". Now then, in the neural network such as shown in FIG. 2, if the weight at the input value $u^{(L)}$ to the nodes of each layer of L=2, L=3, or L=4 is expressed by $w^{(L)}$, the differential due to the weight $w^{(L)}$ of the error function E, that is, the gradient $\partial E/\partial w^{(L)}$, can be rewritten as shown in the following formula:

$$\partial E/\partial w^{(L)}=(\partial E/\partial u^{(L)})(\partial u^{(L)}/\partial w^{(L)}) \tag{1}$$

where, $z^{(L-1)}\cdot\partial w^{(L)}=\partial u^{(L)}$, so if $(\partial E/\partial u^{(L)})=\delta^{(L)}$, the above formula (1) can be shown by the following formula:

$$\partial E/\partial w^{(L)}=\delta^{(L)}\cdot z^{(L-1)} \tag{2}$$

Here, if $u^{(L)}$ fluctuates, fluctuation of the error function E is caused through the change in the sum input value $u^{(L+1)}$ of the following layer, so $\delta^{(L)}$ can be expressed by the following formula.

$$\delta^{(L)} = \left(\frac{\partial E}{\partial u^{(L)}}\right) = \sum_{k=1}^{k}\left(\frac{\partial E}{\partial u_K^{(L+1)}}\right)\left(\frac{\partial u_k^{(L+1)}}{\partial u^{(L)}}\right)(k = 1, 2 \ldots) \tag{3}$$

where, if $z^{(L)}=f(u^{(L)})$, the input value $u_k^{(L+1)}$ appearing at the right side of the above formula (3) can be expressed by the following formula:

$$\text{Input value } u_k^{(L+1)}=\Sigma_{k=1}^{k}w_k^{(L+1)}\cdot z^{(L)}=\Sigma_{k=1}^{k}w_k^{(L+1)}\cdot f(u^{(L)}) \tag{4}$$

where, the first term $(\partial E/\partial u^{(L+1)})$ at the right side of the above formula (3) is $\delta^{(L+1)}$, and the second term $(\partial u_k^{(L+1)}/\partial u^{(L)})$ at the right side of the above formula (3) can be expressed by the following formula:

$$\partial(w_k^{(L+1)}\cdot z^{(L)})/\partial u^{(L)}=w_k^{(L+1)}\cdot\partial f(u^{(L)})/\partial u^{(L)}=w_k^{(L+1)}\cdot f'(u^{(L)}) \tag{5}$$

Therefore, $\delta^{(L)}$ is expressed by the following formula:

$$\delta^{(L)} = \sum_{k=1}^{k} w_k^{(L+1)} \cdot \delta^{(L+1)} \cdot f'(u^{(L)}) \tag{6}$$

$$\text{That is, } \delta^{(L-1)} = \sum_{k=1}^{k} w_k^{(L)} \cdot \delta^{(L)} \cdot f'(u^{(L-1)})$$

That is, if $\delta^{(L+1)}$ is found, it is possible to find $\delta^{(L)}$.

Now then, when training data $y_t$ is found for a certain input value, and the output value from the output layer corresponding to this input value is "y", if the square error is used as the error function, the square error E is found by $E=\frac{1}{2}(y-y_t)^2$. In this case, at the node of the output layer (L=4) of FIG. 2, the output value "y" becomes $f(u^{(L)})$, therefore, in this case, the value of $\delta^{(L)}$ at the node of the output layer (L=4) becomes like in the following formula:

$$\delta^{(L)}=\partial E/\partial u^{(L)}=(\partial E/\partial y)(\partial y/\partial u^{(L)})=(y-y_t)\cdot f'(u^{(L)}) \tag{7}$$

In this regard, in the embodiments of the present invention, as explained above, $f(u^{(L)})$ is an identity function and $f'(u^{(L)})=1$. Therefore, $\delta^{(L)}=y-y_t$ and $\delta^{(L)}$ are found.

If $\delta^{(L)}$ is found, the $\delta^{(L-1)}$ of the previous layer is found by using the above formula (6). The δ of the previous layer is successively found in this way. Using these values of δ, from the above formula (2), the differential of the error function E, that is, gradient $\partial E/\partial w^{(L)}$ is found for each weight "w". If the gradient $\partial E/\partial w^{(L)}$ is found, this gradient $\partial E/\partial w^{(L)}$ is used to update the value of the weight "w" so that the value of the error function E decreases. That is, the value of the weight "w" is learned. Note that, when as the training data, a batch or minibatch is used, as the error function E, the following mean squared error E is used:

$$\text{Mean Squared error } E = \frac{1}{n}\sum_{k=1}^{k}\frac{1}{2}(y_k - y_t)^2 \tag{8}$$

$(k = 1, 2 \ldots, n$ is total number of training data)

On the other hand, if online learning designed to sequentially calculate the square error is performed, as the error function E, the above square error E is used.

Embodiments According to Present Invention

Next, referring to FIG. 7A from FIG. 8B, a first embodiment according to the present invention will be explained. In this first embodiment according to the present invention, as shown in FIG. 4A, a neural network comprised of one input layer (L=1), one hidden layer (L=2), and one output layer (L=3) is used. However, in the first embodiment according to the present invention, the number of nodes in the hidden layer (L=2) differs from FIG. 4A and is made three or four. Note that, in each of FIG. 7A to FIG. 8B, the broken line shows the waveforms of true quadratic functions. The black circles show the training data, while the white circles show the output value "y" after learning the weight of the neural network so that the output value "y" corresponding to the input value "x" matches the training data, the solid line curve shows the relationship between the input value "x" and the output value "y" after learning, and R shows the presumed usable range of the input value "x".

Figure 7A:
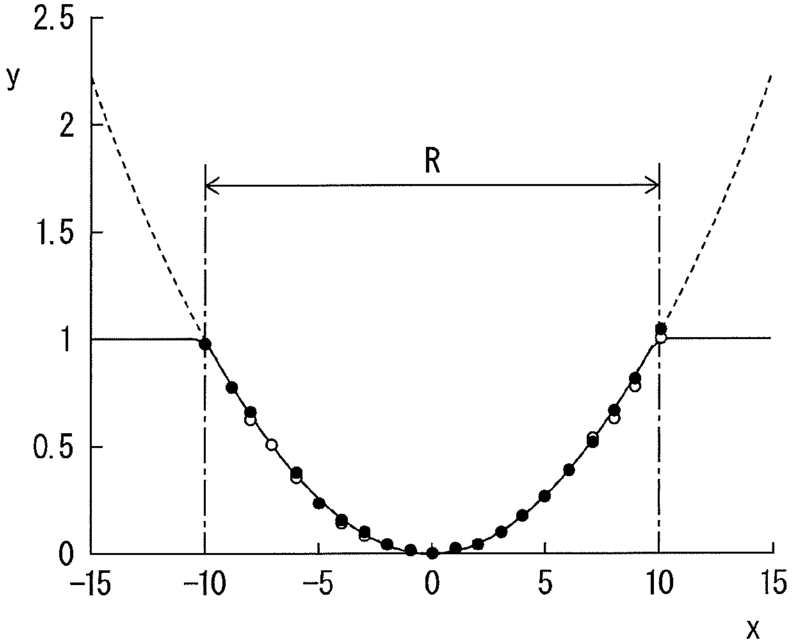
FIG. 7A and FIG. 7B are views for explaining the problem to be solved by the present invention.
Figure 7B:
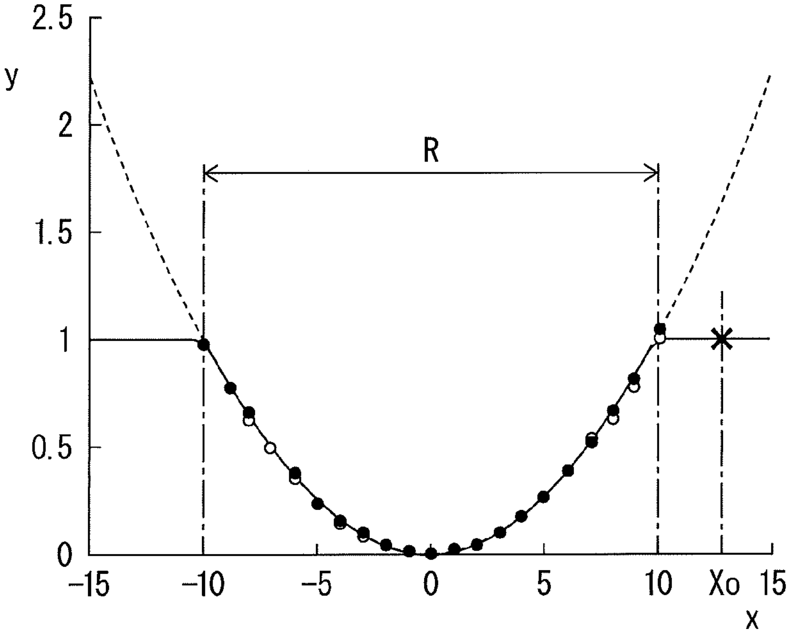

Now then, FIG. 7A and FIG. 7B are views for explaining the technical problem to be solved by the present invention. Therefore, first, referring to FIG. 7A and FIG. 7B, the technical problem to be solved by the present invention will be explained. FIG. 7A shows the case of learning the weights of a neural network so that for the input value "x" in the presumed usable range R, the amount of output "y" becomes a quadratic function $y=ax^2$ ("a" is a constant) of the input value "x" by using the neural network used in the first embodiment. As explained above, as shown in FIG. 4A, even if the hidden layer (L=2) of the neural network only has two nodes, as shown by the range W of (III) of FIG. 4B, it is possible to express a function similar to a quadratic function, but if like in the first embodiment according to the present invention, making the number of nodes of the hidden layer (L=2) of the neural network three or more, as shown in FIG. 7A, in the presumed usable range R of the input value "x", it becomes possible to express the output value "y" as a function substantially completely matching a quadratic function.

That is, when learning is performed for the presumed usable range R of the input value "x", as will be imagined from the explanation made with reference to FIG. 4B, for the presumed usable range R, the output value "y" is expressed as a function substantially completely matching a quadratic function by a suitable combination of the curved parts of a plurality of Sigmoid functions σ. However, outside of the presumed usable range R of the input value "x", learning is not performed, so as shown by the solid line, the straight parts of the two ends of a curved part greatly changing in a Sigmoid function r appear as they are as the output value "y". Therefore, the output value "y" after learning, as shown by the solid line in FIG. 7A, appears in the form of a function substantially completely matching a quadratic function in the presumed usable range R of the input value "x" and appears in a form close to straight lines not changing much at all with respect to the input value "x" outside the presumed usable range R of the input value "x".

In the case shown in FIG. 7A, when the input value "x" is an intermediate value of two adjoining training data in the presumed usable range R of the input value "x", the output value "y" becomes a value on the curve shown by the solid line, that is, an intermediate value of these two training data. Therefore, if in this way a region with no training data is an interpolation region, a suitable output value "y" can be obtained. As opposed to this, if the input value "x", for example, as shown by $x_0$ in FIG. 7B, ends up outside the presumed usable range R of the input value "x", in FIG. 7B, the output value "y" will not become an output value "y" near the quadratic curve shown by the broken line, but will become an output value "y" shown by "x" on the solid line. That is, the output value "y" will end up becoming a value greatly deviating from the true output value "y". If in this way a region with no training data is an extrapolation region, a suitable output value "y" cannot be obtained. Therefore, in the present invention, the electronic control unit 30 is constructed so that a suitable output value "y" can be obtained even if in this way the input value "x" becomes outside the presumed usable range R.

Figure 8A:
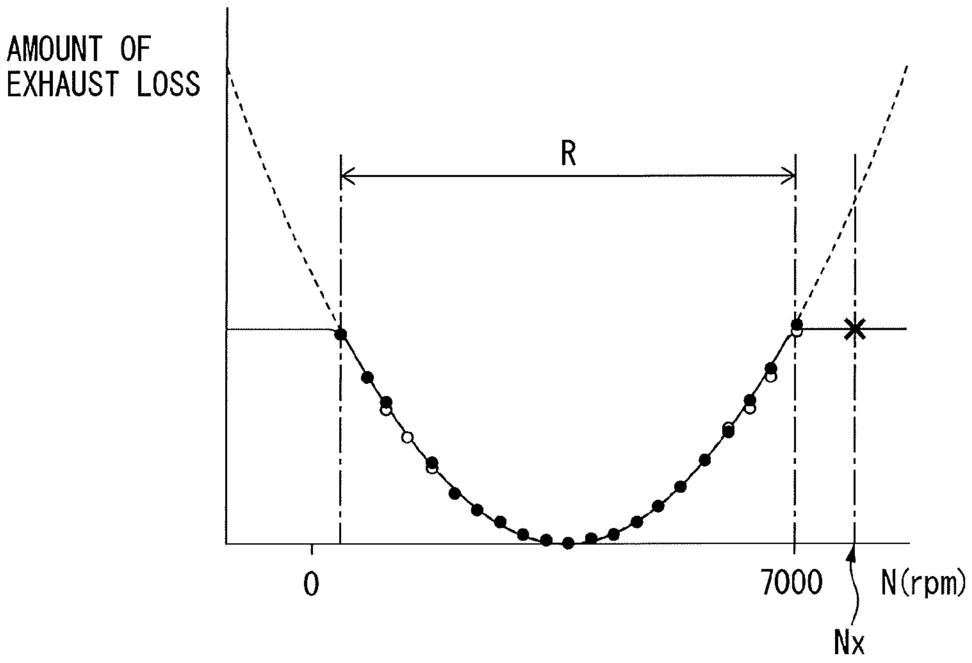
FIG. 8A and FIG. 8B respectively are views showing a neural network and the relationship between input values and output values of the neural network.
Figure 8B:
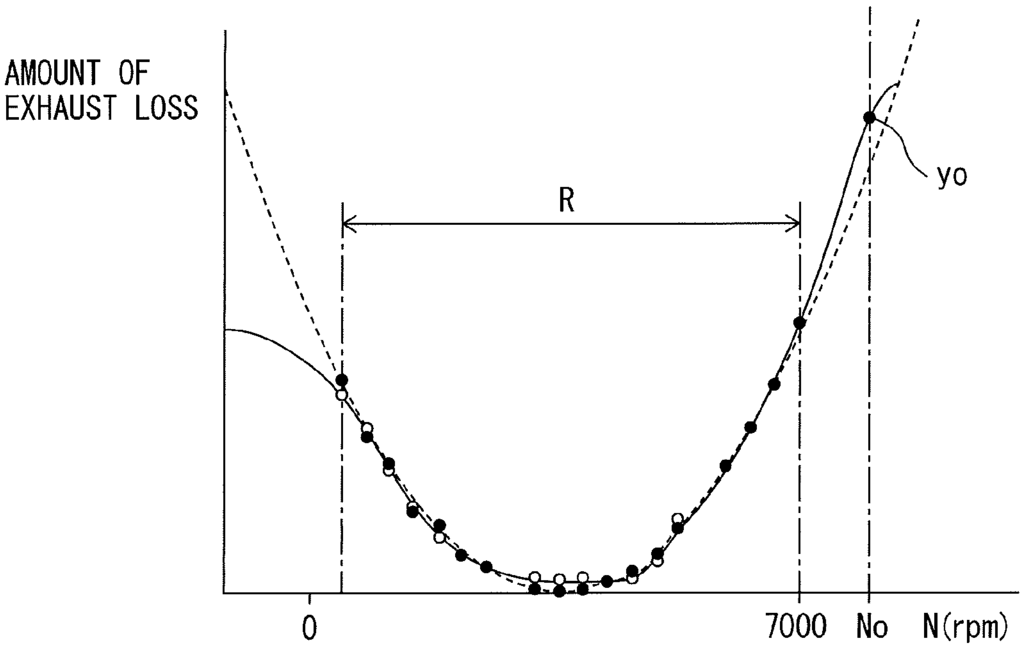

Next, this will be explained for a specific example with reference to FIG. 8A and FIG. 8B showing a first embodiment according to the present invention. In the field of internal combustion engines, when the value of an operating parameter of the engine is defined as an input value "x", sometimes the targeted amount of the output "y" becomes the form of a quadratic function of the input value "x". FIG. 8A shows, as one example of such a case, a case where the value of the operating parameter of the engine, that is, the input value "x", is comprised of the engine speed N (rpm), while the targeted amount of output "y" is comprised of the amount of exhaust loss. Note that, the usable range of the engine speed N is determined in accordance with the engine if that engine is known. FIG. 8A shows the case where the upper limit of the usable range of the engine speed N is 7000 (rpm). In this case, in the first embodiment according to the present invention, the usable range R of the engine speed N to be learned, as shown in FIG. 8A, is made 600 (rpm) (idling speed) to 7000 (rpm).

On the other hand, in FIG. 8A, the training data shown by the black circles are the values obtained by experiments. That is, the amount of exhaust loss shows the amount of heat energy exhausted from an engine combustion chamber and is proportional to the amount of exhaust gas exhausted from an engine combustion chamber and proportional to the temperature difference between the temperature of exhaust gas exhausted from the engine combustion chamber and the outside air temperature. This amount of exhaust loss is calculated based on detected values of the gas temperature etc. when actually operating the engine. Therefore, this calculated amount of exhaust loss shows values obtained by experiments. The training data shown in FIG. 8A shows the amount of exhaust loss obtained by experiments for each engine speed N. In the first embodiment shown in FIG. 8A, the weight of the neural network is learned so that, for an engine speed N in the presumed usable range R, the output value "y" matches the training data. The solid line in FIG. 8A shows the relationship between the engine speed N and the amount of output "y" after learning ends.

As will be understood from FIG. 8A, the amount of exhaust loss becomes a quadratic function with a smallest value (>0) at the engine speed N in the middle of the presumed usable range R. In this case, when the engine speed N is within the presumed usable range R, a suitable output value "y", that is, an accurate amount of exhaust loss, can be obtained. As opposed to this, when the input value "x", for example, as shown by Nx in FIG. 8A, ends up becoming outside the presumed usable range R of the engine speed N, in FIG. 8A, the output value will not become an output value "y" near the quadratic curve shown by the broken line, but will become an output value "y" shown by "x" on the solid line. That is, the output value "y" will end up becoming a value greatly deviating from the true output value "y". If in this way ending up becoming outside the presumed usable range R of the engine speed N, a suitable output value "y" cannot be obtained.

Therefore, in the first embodiment according to the present invention, as shown in FIG. 8B, training data $y_0$ is set for an engine speed No outside of the presumed usable range R of the engine speed N. This training data $y_0$, unlike the training data in the presumed usable range R of the engine speed N, is a past empirical value or a value predicted from a physical law. That is, in the presumed usable range R of the engine speed N, the amount of exhaust loss obtained by experiments, that is, the output value "y" obtained by experiments, is used as the training data, while outside of the presumed usable range R of the engine speed N, the amount of exhaust loss obtained by prediction without relying on experiments, that is, the output value "y" obtained by prediction without relying on experiments, is used as the training data. Therefore, in the first embodiment according to the present invention, these training data obtained by experiments and training data obtained by prediction are used to learn the weights of the neural network so that the amount of exhaust loss changing according to the engine speed N, that is, the output value "y", matches the training data corresponding to the engine speed N.

If the weights and the biases of the neural network are learned by using the training data obtained by experiments and training data obtained by prediction in this way, the curve showing the relationship between the engine speed N and the output value "y" after the end of learning is moved to a higher position in the speed region of the engine speed N higher than 7000 (rpm), that is, outside of the presumed usable range R of the engine speed N, so that, as shown by the solid line in FIG. 8B, it passes through the training data $y_0$. As a result, as will be understood from FIG. 8B, at least in the range of the engine speed N from 7000 (rpm) to Nx, the difference between the output value "y" after learning shown by the solid line and the actual amount of exhaust loss shown by the broken line quadratic curve becomes much smaller compared with the case shown in FIG. 8A. Therefore, even if the engine speed N becomes higher than the presumed usable range R, the amount of exhaust loss can be estimated relatively accurately.

Note that, regarding the training data obtained by prediction without relying on experiments, a plurality of training data can be set outside the presumed usable range R of the engine speed N. For example, in FIG. 8B, it is possible to set training data obtained by prediction without relying on experiments not only at the higher engine speed side from the presumed usable range R, but also the lower engine speed side from presumed usable range R.

Now then, the internal combustion engine used in this embodiment of the present invention, as shown in FIG. 1, is provided with the electronic control unit 30. This electronic control unit 30 is comprised of a parameter value acquiring unit for acquiring the value of an operating parameter of the engine, a processing unit for performing processing by using a neural network comprised of an input layer, at least one hidden layer, and output layer, and a storage unit. Here, the input port 35 shown in FIG. 1 configures the above-mentioned parameter value acquiring unit, the CPU 34 configures the above-mentioned processing unit, and the ROM 32 and RAM 33 configure the above-mentioned storage unit. Note that, in the CPU 34, that is, the above-mentioned processing unit, the value of the operating parameter of the engine is input to the input layer, while an output value changing in accordance with the value of the operating parameter of the engine is output from the output layer. Further, the presumed usable range R is stored in advance in the ROM 32, that is, in the above-mentioned storage unit, for a value of an operating parameter of the engine. Furthermore, the output value obtained by experiments is stored as training data in the RAM 33, that is, in the above-mentioned storage unit, for a value of the operating parameter of the engine in the presumed usable range R, while the output value obtained by prediction without relying on experiments is stored as training data in the RAM 33, that is, in the above-mentioned storage unit, for a value of the operating parameter of the engine outside the presumed usable range R.

That is, in this embodiment according to the present invention, there is a presumed usable range R for the value of an operating parameter of the engine, and this presumed usable range R is stored in advance in the storage unit. Further, the output value "y" obtained by experiments is stored as training data in the storage unit for a value of the operating parameter of the engine in the presumed usable range R, while the output value $y_0$ obtained by prediction without relying on experiments is stored as training data in the storage unit for a value of the operating parameter of the engine outside the presumed usable range R. Further, the training data obtained by experiments and the training data obtained by prediction are used to learn at least one weight and at least one bias of the neural network at the processing unit so that the output value changing in accordance with the value of the operating parameter of the engine matches the training data corresponding to the value of the operating parameter of the engine. The neural network for which the weight and the bias are learned is used to estimate the output value for the values of the operating parameter of the engine.

Next, referring to FIG. 9A to FIG. 11B, a second embodiment according to the present invention will be explained. This second embodiment shows the case of applying the present invention to a special internal combustion engine for low load use, for example, an internal combustion engine for hybrid use. In this second embodiment, the neural network is used to create a model outputting an output value "y" showing the amount of $NO_X$ exhaust from an opening degree of a throttle valve 12, an engine speed N, and an ignition timing. Note that, in the internal combustion engine used in the second embodiment, the usable range of the opening degree of the throttle valve 12 is set from 5.5° to 11.5° (opening degree of the throttle valve 12 at maximum closed position is made 0°), the usable range of the engine speed N is set to 1600 (rpm) to 3000 (rpm), and the usable range of the ignition timing is set to 0° (compression top dead center) to ATDC (after compression top dead center) 40°.

In this second embodiment, a neural network such as shown in FIG. 2 is used. However, in this second embodiment, there are three operating parameters of the engine comprising the operating parameters of the opening degree of the throttle valve 12, the engine speed N, and the ignition timing, so there are three input values of the neural network. Therefore, in this second embodiment, there are three nodes in the input layer (L=1) of the neural network shown in FIG. 2. Input values showing the opening degree of the throttle valve 12, the engine speed N, and the ignition timing are input to the nodes of the input layer (L=1). On the other hand, there is a single node in the output layer (L=4) in the same way as FIG. 2. Further, the number of nodes of the hidden layer (L=2) and the number of nodes of the hidden layer (L=3) are similar to FIG. 2 or are made larger than what is shown in FIG. 2.

Figure 9A:
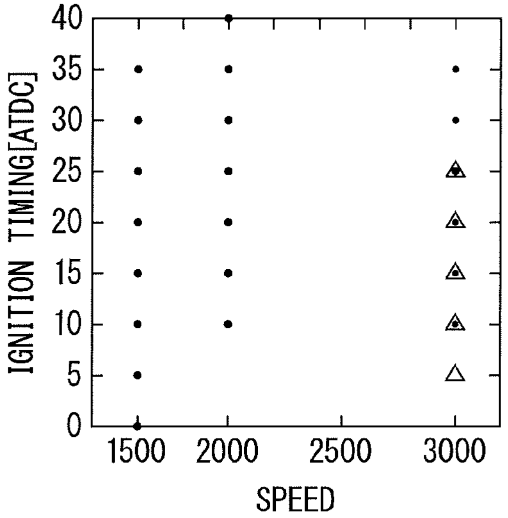
FIG. 9A and FIG. 9B respectively are views showing the distribution of training data with respect to the engine speed and the ignition timing, and the distribution of training data with respect to the ignition timing and the throttle opening degree.
Figure 9B:
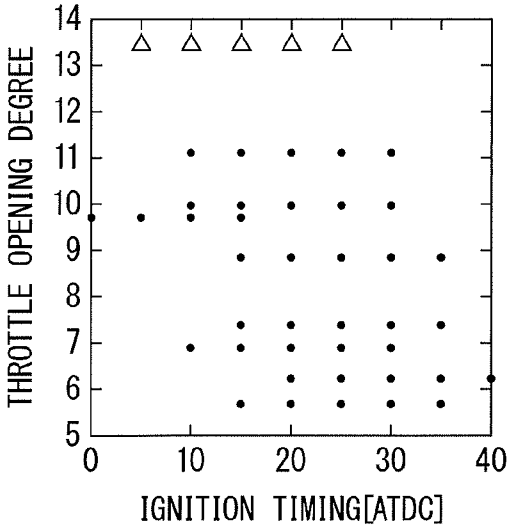
Figure 10A:
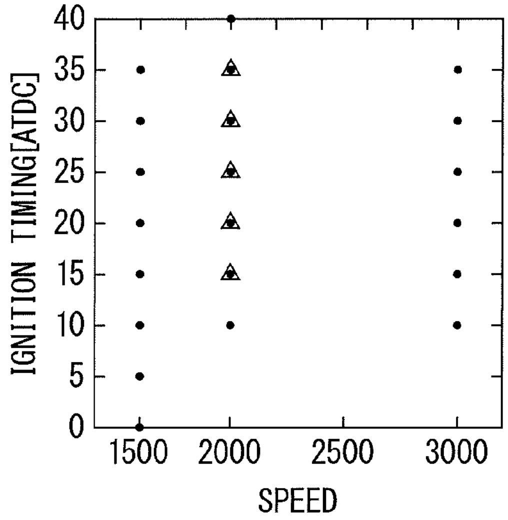
FIG. 10A and FIG. 10B respectively are views showing the distribution of training data with respect to the engine speed and the ignition timing, and the distribution of training data with respect to the ignition timing and the throttle opening degree.
Figure 10B:
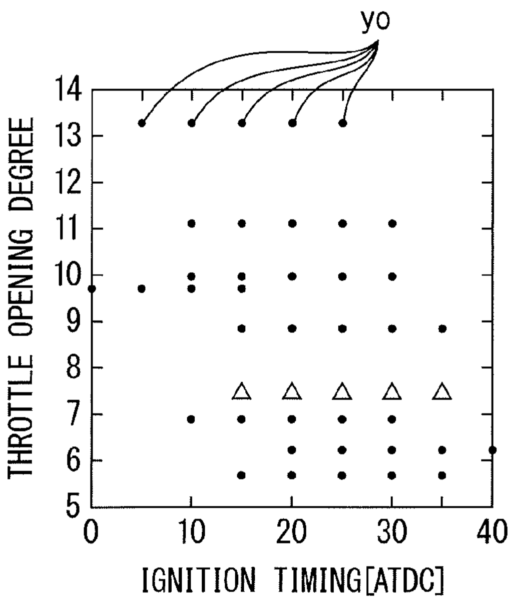
Figure 11A:
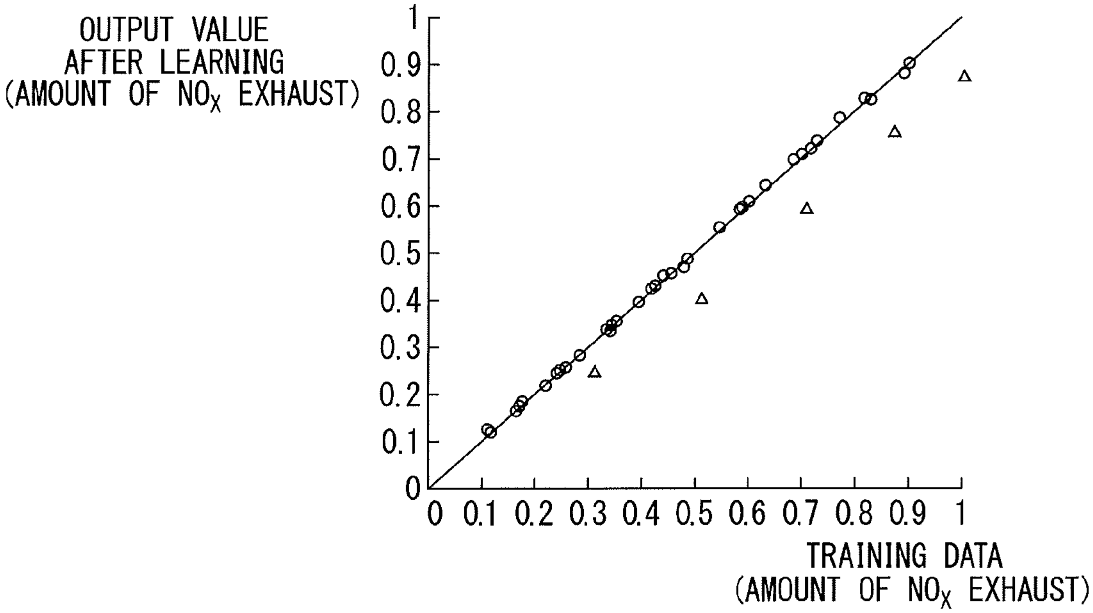
FIG. 11A and FIG. 11B are views showing the relationships between the training data and the output values after learning.
Figure 11B:
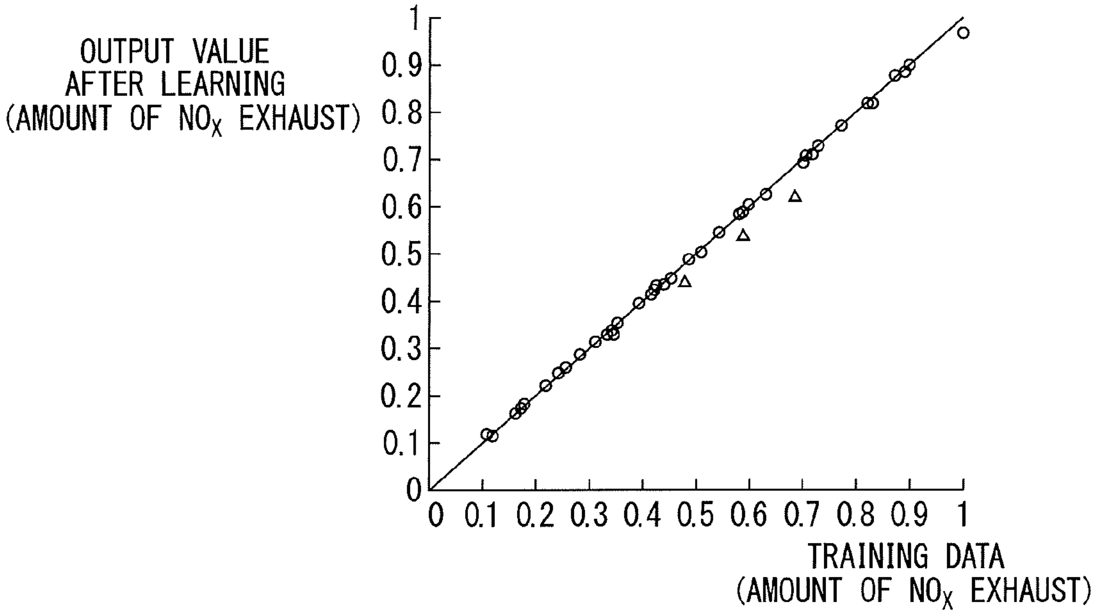

Next, referring to FIG. 9A to FIG. 10B showing the distributions of training data and FIG. 11A and FIG. 11B showing the results of learning, the technical problem to be solved by second embodiment and the method of solution of the technical problem will be explained. First, referring to FIG. 9A to FIG. 11B, FIG. 9A and FIG. 10A show distributions of training data with respect to the ignition timing and the engine speed N, while FIG. 9B and FIG. 10B show distributions of training data with respect to the throttle valve opening degree and the ignition timing. Note that, in FIG. 9A to FIG. 11B, the black circles show the points where the training data is set, while the triangle marks show the locations where the training data is not set. On the other hand, in this second embodiment, the throttle valve opening degree, the engine speed N, and the ignition timing are input to the nodes of the input layer (L=1) of the neural network and the weights and the biases of the neural network are learned so that the output value "y" showing the amount of $NO_X$ exhaust matches the training data obtained by experiments. In FIG. 11A and FIG. 11B, the relationships between the output value "y" after learning and the training data obtained by experiments are shown by circle marks and triangle marks. Note that, in FIG. 11A and FIG. 11B, the values of the output value "y" after learning and the training data are shown normalized so that the maximum value becomes 1.

Now then, FIG. 9A and FIG. 9B are views for explaining the technical problem to be solved by the second embodiment. Therefore, first, referring to FIG. 9A and FIG. 9B, the technical problem to be solved by the second embodiment will be explained. As explained above, in FIG. 9A and FIG. 9B, the black circles show points where the training data is set. In this case, all of the black circles shown in FIG. 9A and FIG. 9B show the training data obtained by experiments. Therefore, from FIG. 9A and FIG. 9B, for what kind of throttle valve opening degree, what kind of engine speed N, and what kind of ignition timing the training data obtained by experiments is set is learned. For example, in FIG. 9A, the training data obtained by experiments is set when the engine speed N is 2000 (rpm) and the ignition timing is ATDC20°, while as shown in FIG. 9B, the training data obtained by experiments is set for various throttle valve opening degrees when the ignition timing is ATDC20°.

Now then, as explained above, in the internal combustion engine used in the second embodiment, the usable range of the opening degree of the throttle valve 12 is set to 5.5° to 11.5°, the usable range of the engine speed N is set to 1600 (rpm) to 3000 (rpm), and the usable range of the ignition timing is set to 0° (compression top dead center) to ATDC40°. FIG. 9A and FIG. 9B show the case where training data obtained by experiments is set for the usable ranges of these, that is, the usable range of the throttle valve opening degree, the usable range of the engine speed N, and the usable range of the ignition timing. In this second embodiment, the weights and the biases of the neural network are learned so that when the throttle valve opening degree, the engine speed N, and the ignition timing are used in these usable ranges, the output value "y" showing the amount of $NO_X$ exhaust matches the training data obtained by experiments. FIG. 11A shows by circle marks the relationship between the output value "y" after learning at this time and the training data obtained by experiments. Note that, the training data obtained by experiments shows the actually detected amount of $NO_X$ exhaust. In the second embodiment, the actual amount of $NO_X$ exhaust is calculated from the $NO_X$ concentration detected by the $NO_X$ sensor 23 and the amount of intake air detected by the intake air mount detector 10.

As shown in FIG. 11A, the circle marks showing the relationship between the output value "y" after learning and the training data obtained by experiments cluster about a single straight line. Therefore, it is learned that the output value "y" after learning is made to match the training data obtained by experiments. In this regard, for example, if giving the opening degree of the throttle valve 12 as an example, the opening degree of the throttle valve 12 ends up deviating from the correct opening degree due to individual differences in the engines or aging, and even if the usable range of the opening degree of the throttle valve 12 was set to 5.5° to 11.5°, in actuality, sometimes the opening degree of the throttle valve 12 ends up exceeding the preset usable range. The triangle marks shown in FIG. 11A show the results of learning in the case where the opening degree of the throttle valve 12 ends up exceeding the preset usable range when training data is not set at the positions shown by the triangle marks (throttle valve opening) degree=13.5° in FIG. 9B, and, further, training data is not set at the triangle marks in FIG. 9A.

From the triangle marks of FIG. 11A, it is learned that when teacher data is not set outside the usable range of the opening degree of the throttle valve 12, the output value "y" after learning ends up greatly deviating from the training data. On the other hand, the circle marks of FIG. 11B show the results of learning in the case of setting training data $y_0$ predicted from past empirical values or a physical law at the positions shown by the triangle marks in FIG. 9B as shown by the black circles $y_0$ in FIG. 10B. From the circle marks of FIG. 11B, it is learned that when setting training data outside the usable range of the opening degree of the throttle valve 12, the output value "y" after learning is made to match the training data. Note that, the triangle marks of FIG. 11B show the results of learning in the case where training data is not set for the points shown by the triangle marks in FIG. 10A and FIG. 10B, that is, the points in the interpolation regions able to be interpolated from other training data. As shown by the triangle marks shown in FIG. 11B, in this case, it is learned that the output value "y" after learning does not deviate from the training data much at all.

Therefore, in this second embodiment, as shown in FIG. 10B, training data $y_0$ predicted from past empirical values or a physical law is set outside the usable range of the opening degree of the throttle valve 12. That is, in this second embodiment, in the presumed usable range of the throttle valve opening degree, the amount of $NO_X$ exhaust obtained by experiments, that is, the output value "y" obtained by experiments, is used as the training data, while outside the presumed usable range of the throttle valve opening degree, the amount of $NO_X$ exhaust obtained by prediction without relying on experiments, that is, the output value "y" obtained by prediction without relying on experiments, is used as the training data. Therefore, in the second embodiment according to the present invention, these training data obtained by experiments and training data obtained by prediction are used to learn the weights of the neural network so that the amount of $NO_X$ exhaust changing in accordance with the throttle valve opening degree, that is, the output value "y", matches the training data corresponding to that throttle valve opening degree.

Note that, up until now, the case where the throttle valve opening degrees exceeds the presumed usable range was explained, but the engine speed N sometimes also exceeds the presumed usable range and the ignition timing sometimes also exceeds the presumed usable range. Therefore, outside the presumed usable range of the engine speed N, the output value "y" obtained by prediction without relying on experiments may also be set as the training data and outside the presumed usable range of the ignition timing, the output value "y" obtained by prediction without relying on experiments may also be set as the training data. In this second embodiment, the operating parameters of the engine are the throttle valve opening degree, the engine speed N, and the ignition timing, and accordingly, if expressed comprehensively, in this second embodiment, it can be said that output value obtained by prediction without relying on experiments is set as the training data for values of operating parameters of the engine outside the presumed usable ranges.

In the internal combustion engine used in this second embodiment as well, as shown in FIG. 1, the electronic control unit 30 is provided. This electronic control unit 30 comprises a parameter value acquiring unit for acquiring the values of operating parameters of the engine, a processing unit for performing processing by using a neural network comprised of an input layer, at least one hidden layer, and output layer, and a storage unit. Further, in this second embodiment as well, the input port 35 shown in FIG. 1 configures the above-mentioned parameter value acquiring unit, the CPU 34 configures the above-mentioned processing unit, and the ROM 32 and RAM 33 configure the above-mentioned storage unit. Further, in this second embodiment as well, in the CPU 34, that is, the above-mentioned processing unit, the values of the operating parameters of the engine are input to the input layer and an output value changing in accordance with the values of the operating parameters of the engine is output from the output layer. Further, the presumed usable ranges for values of the operating parameters of the engine are stored in advance in the ROM 32, that is, in the above-mentioned storage unit. Furthermore, the output value obtained by experiments is stored as training data in the RAM 33, that is, in the above-mentioned storage unit, for values of the operating parameters of the engine in the presumed usable ranges while the output value obtained by prediction without relying on experiments is stored as training data in the RAM 33, that is, the above-mentioned storage unit, for values of the operating parameters of the engine outside of the presumed usable ranges.

That is, in this second embodiment as well, there are presumed usable ranges for values of the operating parameters of the engine. The presumed usable ranges are stored in advance in the storage unit. Further, the output value "y" obtained by experiments is stored as training data in the storage unit for values of the operating parameters of the engine in the presumed usable ranges, while the output value $y_0$ obtained by prediction without relying on experiments is stored as training data in the storage unit for values of the operating parameters of the engine outside of the presumed usable ranges. Furthermore, the training data obtained by experiments and the training data obtained by prediction are used in the processing unit to learn the weights of the neural network so that the output value changing in accordance with the values of the operating parameters of the engine matches the training data corresponding to the values of the operating parameters of the engine. The neural network for which the weight and the bias are learned is used to estimate the output value for the values of the operating parameters of the engine.

Figure 12A:
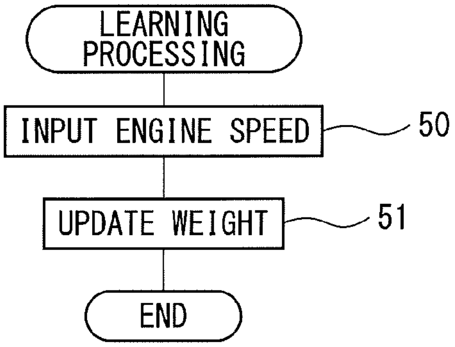
FIG. 12A and FIG. 12B are flow charts for performing learning processing.
Figure 12B:
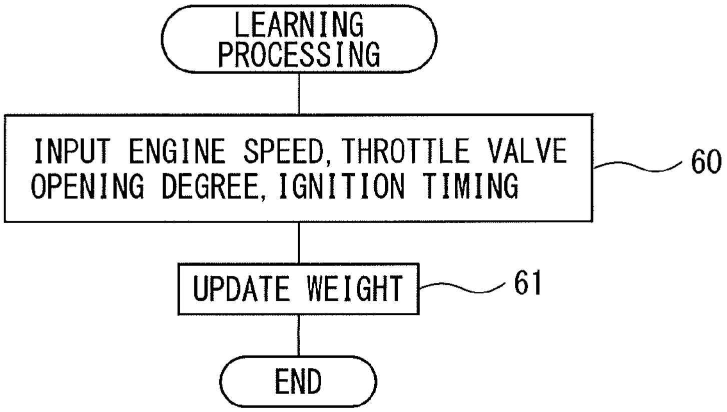

The learning processing of the first embodiment shown in FIG. 8A and the learning processing of the second embodiment shown in FIGS. 10A and 10B are performed before the vehicle is commercially sold, is performed on-board during vehicle operation after the vehicle is commercially sold, or is performed before the vehicle is commercially sold and is performed on-board during vehicle operation after the vehicle is commercially sold. FIG. 12A shows the learning processing routine of the first embodiment performed on-board during vehicle operation, while FIG. 12B shows the learning processing routine of the second embodiment performed on-board during vehicle operation. Note that, the learning processing routines shown in FIG. 12A and FIG.

12B are performed by interruption every fixed time period, for example, by interruption every second.

Referring to FIG. 12A, first, at step 50, the engine speed is input to the node of the input layer of the neural network. Next, at step 51, based on the output value "y" output from the node of the output layer of the neural network and the training data, the error backpropagation algorithm is used to learn the weights and the biases of the neural network so that the output value "y" matches the training data. On the other hand, if referring to FIG. 12B, first, at step 60, the throttle valve opening degree, the engine speed, and the ignition timing are input to the nodes of the input layer of the neural network. Next, at step 61, based on the output value "y" output from the node of the output layer of the neural network and the training data, the error backpropagation algorithm is used to learn the weights and the biases of the neural network so that the output value "y" matches the training data.

The invention claimed is:

1. A control device of an internal combustion engine having an electronic control unit, said electronic control unit comprising;

a parameter value acquiring unit for acquiring a value of an operating parameter of the engine, a processing unit for performing processing using a neural network comprised of an input layer, at least one hidden layer, and an output layer, and a storage unit, the value of the operating parameter of the engine being input to the input layer, and an output value which changes in accordance with the value of the operating parameter of the engine being output from the output layer, wherein there is a presumed usable range for the value of the operating parameter of the engine, an output value obtained by experiments is stored as training data in the storage unit for a value of the operating parameter of the engine within the presumed usable range, an output value obtained by prediction is stored as training data in the storage unit for a value of the operating parameter of the engine outside the presumed usable range, the training data obtained by experiments and the training data obtained by prediction are used in the processing unit to learn at least one weight and at least one bias of the neural network so that an output value which changes in accordance with the value of the operating parameter of the engine matches the training data corresponding to the value of the operating parameter of the engine, and the neural network for which the weight and the bias are learned is used to estimate the output value for the value of the operating parameter of the engine.

2. The control device of an internal combustion engine according to claim 1, wherein the output value obtained by prediction is a past empirical value.

3. The control device of an internal combustion engine according to claim 1, wherein the operating parameter of the engine is an engine speed, while the output value is an amount of exhaust loss.

4. The control device of an internal combustion engine according to claim 1, wherein the operating parameter of the engine is a combination of a throttle valve opening degree, engine speed, and ignition timing, while the output value is an amount of $NO_X$ exhaust.

* * * * *